US008819067B2

(12) United States Patent
Youn et al.

(10) Patent No.: US 8,819,067 B2
(45) Date of Patent: Aug. 26, 2014

(54) NON-DETERMINISTIC AUDIT LOG PROTECTION

(75) Inventors: Paul Youn, Redwood City, CA (US); Javed Samuel, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 424 days.

(21) Appl. No.: 12/950,938

(22) Filed: Nov. 19, 2010

(65) Prior Publication Data

US 2012/0131057 A1 May 24, 2012

(51) Int. Cl.
*G06F 7/00* (2006.01)
*G06F 17/30* (2006.01)

(52) U.S. Cl.
USPC .............................. 707/783; 707/769; 726/22

(58) Field of Classification Search
None
See application file for complete search history.

(56) References Cited

U.S. PATENT DOCUMENTS

| 7,555,645 | B2 | 6/2009 | Vissapragada | |
|---|---|---|---|---|
| 7,574,501 | B2 | 8/2009 | Louie | |
| 7,634,520 | B1 | 12/2009 | Seiler | |
| 7,694,143 | B2 | 4/2010 | Karimisetty | |
| 7,712,137 | B2 | 5/2010 | Meier | |
| 2006/0004701 | A1 | 1/2006 | Bacon | |
| 2006/0265748 | A1* | 11/2006 | Potok | 726/23 |
| 2007/0288768 | A1* | 12/2007 | Nesta et al. | 713/194 |
| 2008/0077752 | A1* | 3/2008 | Kinoshita | 711/154 |
| 2009/0019092 | A1* | 1/2009 | Dettinger et al. | 707/202 |
| 2009/0092252 | A1* | 4/2009 | Noll et al. | 380/277 |
| 2009/0282083 | A1 | 11/2009 | Richins | |
| 2010/0011412 | A1* | 1/2010 | Maximilien et al. | 726/1 |
| 2010/0125855 | A1* | 5/2010 | Ferwerda et al. | 719/317 |
| 2010/0211826 | A1* | 8/2010 | Villella et al. | 714/39 |
| 2010/0228674 | A1* | 9/2010 | Ogg et al. | 705/62 |
| 2010/0325727 | A1* | 12/2010 | Neystadt et al. | 726/22 |
| 2010/0332760 | A1* | 12/2010 | McKeen et al. | 711/125 |
| 2011/0145593 | A1* | 6/2011 | Auradkar et al. | 713/189 |

OTHER PUBLICATIONS

Guardium, "Case Study: Implementing Database Auditing, Monitoring and Security in a Leading Blue Cross and Blue Shield Organization", http://www.guardium.com/images/uploads/BCBS_Case_Study_from_Guardium.pdf, Mar. 2007.
Genware Computer Systems Inc., "Genware Audit Processor", http://www.genwarecs.com/docs/GAP_services.pdf, retrieved from the internet Jul. 28, 2010.
Illustro Systems International, LLC., "iKnow System Access Audit Appliance", Retrieved from the internet May 24, 2010, http://www.illustro.com/footer.htm.
Guardium, "Vulnerability Management", Real-Time Database Protection and Compliance, Retrieved from the internet May 24, 2010, http://www.guardium.com/index.php/t2/7/.

(Continued)

*Primary Examiner* — Dung K Chau
(74) *Attorney, Agent, or Firm* — Shun Yao; Park, Vaughan, Fleming & Dowler LLP

(57) ABSTRACT

Embodiments of the present disclosure provide a system that performs non-deterministic auditing. The system audits an operation, a record associated with which is maintained in an audit log. In one embodiment, the system subsequently determines whether the operation satisfies one or more criteria. In response to the operation satisfying the criteria, the system protects the audit log. In a further embodiment, the system protects the audit log based on a probability distribution, which indicates a frequency of audit log protection.

22 Claims, 5 Drawing Sheets

(56) References Cited

OTHER PUBLICATIONS

Guardium, "Change Control", Real-Time Database Protection and Compliance, Retrieved from the internet May 24, 2010, http://www.guardium.com/index.php/t2/6/.

Guardium, "Audit & Report", Real-Time Database Protection and Compliance, Retrieved from the internet May 24, 2010, http://www.guardium.com/index.php/t2/218/.

Oracle, "Oracle Audit Vault", 2009, http://www.oracle.com/technetwork/topics/security/whatsnew/index.html.

Kamra, Ashish et al., "Mechanisms for Database Intrusion Detection and Response", Proceedings on the Second SIGMOD PhD Workshop on Innovative Database Research 9IDAR 2008), Jun. 13, 2008, Vancouver, Canada.

\* cited by examiner

NON-DETERMINISTIC AUDIT LOG PROTECTION

BACKGROUND

1. Field

The present disclosure relates to database auditing. More specifically, the present disclosure relates to a method for non-deterministic audit log protection.

2. Related Art

Database auditing allows a database to monitor actions of database users for security purposes. Typically, database auditing involves creating an audit log file to record various database operations. However, protecting database audit logs is difficult. Audit logs can be modified or deleted by both malicious attackers and accidental mistakes from users.

One way to prevent tampering with audit logs is to apply access control to an audit log file. The database system checks an access control list to determine whether a user has proper privilege to access the audit log. Another way to protect audit logs is to digitally sign the audit log with a private key from time to time. Hence, the signed audit log cannot be altered without the proper private key. The digital signatures of the audit log can also be secured. This way, the audit logs can be read-only and no one should be able to meaningfully modify them.

However, these solutions have a common problem—there is often a "vulnerability window" of opportunity to attack prior to an audit log being signed or protected by access controls (and complete access controls may not be possible). During the vulnerability window, collected audit information is recorded in the audit log, but the audit log is not protected by access control or digital signatures. Thus, during the vulnerability window, an attacker can access and alter the audit log without proper privilege or private key. To solve the "vulnerable window" problem, some systems choose to sign the audit log as soon as the audit information is recorded in the audit logs. Nevertheless, such practice compromises the database system's performance.

SUMMARY

One embodiment of the present disclosure provides a system that performs reactive audit log protection. The system audits an operation, a record associated with which is maintained in an audit log. The system then determines whether the operation satisfies one or more criteria. In response to a determination that the operation satisfies the criteria, the system protects the audit log with additional mechanisms, thereby reducing a vulnerable time-period during which the audit log can be compromised.

In a variation of this embodiment, the operation audited by the system includes one or more of: a database command, a successful or unsuccessful logon to a user session, an access to the audit log, a change to an audit policy, selection of a system or user created table; modification of a system or user created table, an attempt to alter the audit log.

In a variation of this embodiment, protecting the audit log comprises at least one of the following operations:
  signing the audit log;
  encrypting the audit log;
  increasing an access control level associated with the audit log;
  transmitting the audit log to a remote server;
  transmitting a digital signature and time stamp for the audit log to a remote server;
  transmitting a time stamp to a remote server;
  generating a backup digest or cryptographic hash of the audit log;
  generating an additional audit record in the audit log; and
  generating an alert.

In a variation of this embodiment, protecting the audit log involves at least one of the following operations:
  signing the audit log at an increased frequency;
  signing pending audit records at an earlier than scheduled time; and
  selectively signing an administrative action.

In a variation of this embodiment, the criteria indicate at least one of the following:
  an auditing time window;
  a depth of auditing;
  an object for auditing;
  a type of query command for auditing;
  a database session; and
  a user session.

In another embodiment of the present invention, the system audits an operation, a record of which is maintained in an audit log. The system then protects the audit log based on a probability distribution, which indicates a frequency of audit log protection and can be any probability distribution.

In a variation of this embodiment, the system audits the operation based at least on one of:
  an auditing time window;
  an auditing depth;
  an object;
  a database query type;
  a database session; and
  a database user who initiates the operation.

In another variation of the embodiment, protecting the audit log involves signing the audit log and storing the corresponding digital signature in a remote location, or generating a cryptographic hash of the audit log and storing the cryptographic hash in a remote location.

In another variation, the probability distribution is based on at least one of:
  a type of the operation;
  a frequency of execution associated with the operation; and
  a history of execution associated with the operation;
regardless of whether the operation is by a privileged user or not.

In a further variation, a mean value of the probability distributed is adjusted in response to a predefined criterion being satisfied.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

Overview

In embodiments of the present disclosure, the problem of reducing the risk of security attacks to database audit logs during a vulnerability window is solved by non-deterministically protecting the audit log to increase the unpredictability of the vulnerability window. Specifically, some embodiments can increase the unpredictability of the vulnerability window by reactively protecting the audit log in response to an audited operation satisfying one or more predefined criteria. Other embodiments increase the unpredictability of the vulnerability window by protecting the audit log based on a probability distribution.

Computing Environment

Figure 1:
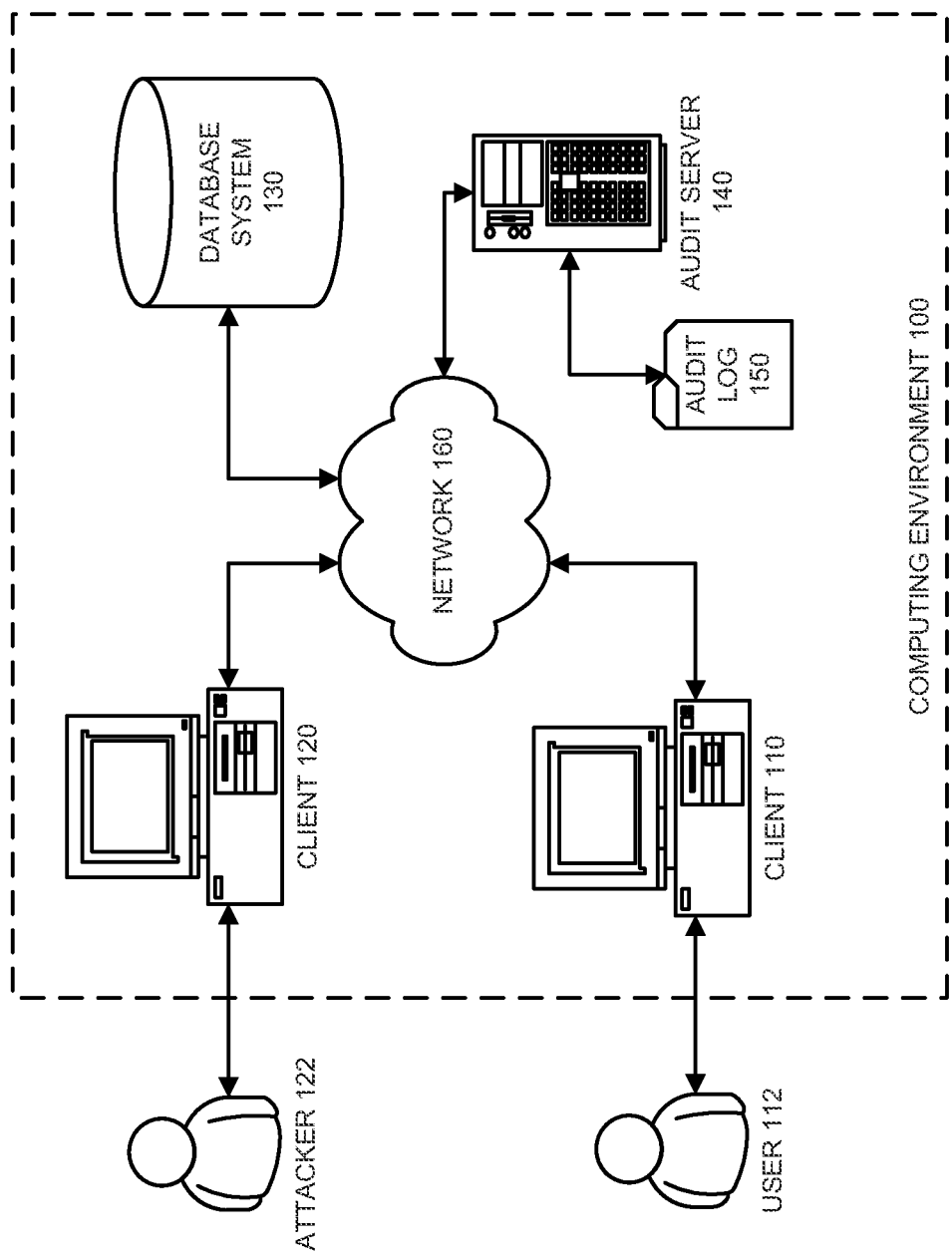
FIG. 1 illustrates a computing environment, which facilitates non-deterministic protection of a database audit log, in accordance with one embodiment of the present disclosure.

FIG. 1 illustrates a computing environment which facilitates non-deterministic audit log protection, in accordance with one embodiment of the present invention. A computing environment 100 includes a number of computer systems. For example, computing environment 100 illustrated in FIG. 1 includes clients 110 and 120, a database system 130, an audit server 140, and a network 160. Clients 110 and 120, database system 130, and audit server 140 are coupled via network 160. Audit server 140 can generally include any mechanism for auditing database operations initiated by a user and received from a client.

Specifically, user 112 may initiate a database operation. The operation is received at database system 130 from client 110 via network 160. The operation is subsequently executed by database system 130 and may be audited by audit server 140. If the operation is audited by audit server 140, audit server 140 creates an entry for an audit record associated with the operation in audit log 150. Audit log 150 may be analyzed to identify malicious attacker 122, who communicates with database system 130 via client 120.

Note that attacker 122 often attempts to access audit log 150 after executing an unauthorized operation to erase traces of the operation. Audit log 150 is especially vulnerable to such attack attempts after the unauthorized operation is recorded in the log and before audit server 140 takes an action to protect audit log 150. In addition, the attacks may not be malicious in nature but could be due to incompetence of an accident. Embodiments of the present disclosure use non-deterministic techniques to protect audit log 150, such that the vulnerability window becomes unpredictable, thereby reducing the chance for attacker 122 to access audit log 150 or the likelihood of inadvertent attacks during the vulnerability window.

Reactive Audit Log Protection

Figure 2:
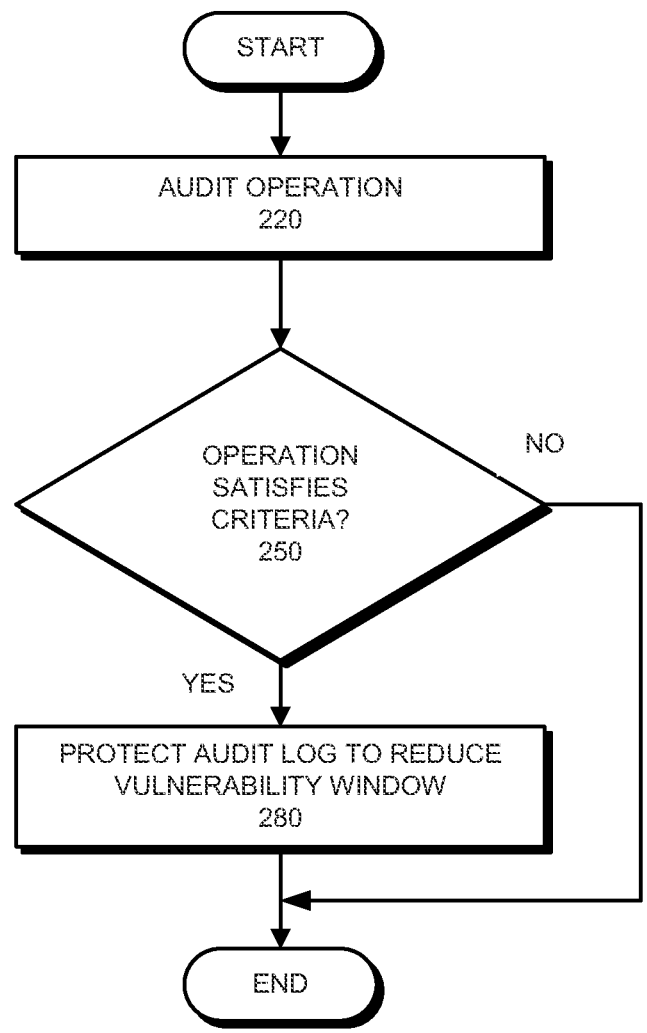
FIG. 2 presents a flow chart illustrating the process of non-deterministic protection of a database audit log by reactively protecting the audit log in response to an audited operation satisfying one or more criteria, in accordance with one embodiment of the present disclosure.

FIG. 2 presents a flow chart illustrating the process of non-deterministic protection of audit log by reactively protecting the audit log in response to an audited operation satisfying one or more criteria in accordance with one embodiment of the present disclosure.

During operation, the system audits an operation, which has been executed by a database system, at an audit server and maintains a record associated with the operation in an audit log (operation 220). Next, the system determines whether the audited operation satisfies one or more criteria (operation 250). The audit criteria can specify a number of operations associated with a high security level. In response to the operation satisfying the criteria, the system protects the audit log associated with the record of the operation, thereby reducing a vulnerability window during which the audit log can be altered by a malicious attacker (operation 280). Note that in one embodiment, the system does not need to take additional actions to protect the audit log if the criteria are not met by the operation. Thus, an administrator can selectively define the criteria to customize conditions for enhanced audit log protection while reducing the performance costs associated with such enhanced audit log protection.

In some embodiments, the operations audited by the audit server can include, but are not limited to, one or more of: execution of a database command, a logon to a user session, a read/write access to the audit log, and a read/write operation to a system table. An administrator can configure which sensitive operations or administrative actions require enhanced protection for the audit log.

Moreover, the administrator may specify various criteria for triggering enhanced protection of the audit log. Such criteria may specify, but are not limited to, an audit time window, a depth of auditing, a type of query command for auditing, a database session, and a user session. The criteria may also depend on the user, whether privileged or not, the frequency of the execution of the operation, both unsuccessful and successful attempts, and/or the past history of operations and audit events in the database system. For example, an attacker may be more likely to attack the audit log within work hours during work days when database activities are typically audited less frequently to reduce interruption with system performance during those work hours. Thus, an administrator may configure the audit server to enhance protection for the audit log when the audit time window falls within the work hours during work days.

In some embodiments, protecting the audit log may involve: digitally signing the audit log with a private key, signing a subset of the audit log data, transmitting the digital signatures to a remote server, writing the access log of the audit log to a write-once memory, encrypting the audit log, increasing an access control level associated with the audit log, transmitting the audit log to a remote server, generating a backup digest or cryptographic hash of the audit log, generating an additional audit record in the audit log, and/or generating an alert. Furthermore, in response to certain database operations or sequence of operations, the audit log can be signed at an increased frequency or at an earlier than previously scheduled time. In addition, the audit server may be configured to selectively sign audit logs related to certain administrative actions. Note that digital signature is an electronic signature that can be used to authenticate the identity of the signer of a log and to ensure that the original content of the log that has been sent is unchanged.

Audit Log Protection Based on Probability Distribution

Figure 3:
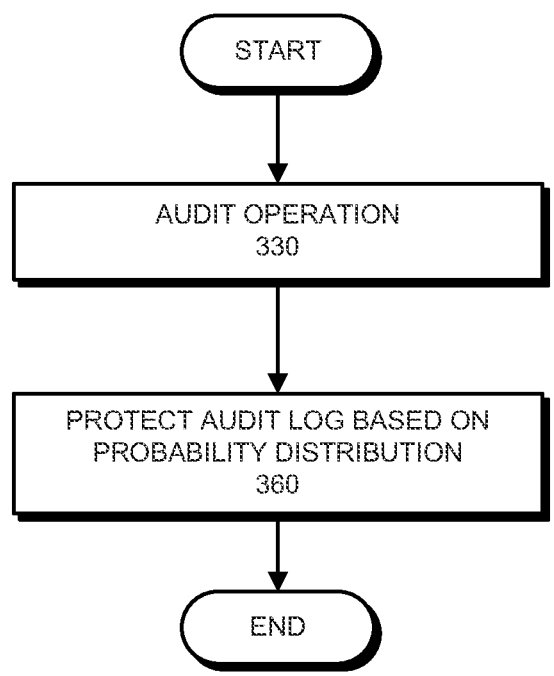
FIG. 3 presents a flow chart illustrating the process of non-deterministic protection of the audit log based on a probability distribution, in accordance with one embodiment of the present disclosure.

FIG. 3 presents a flow chart illustrating the process of non-deterministic auditing by protecting an audit log based on a probability distribution, in accordance with one embodiment of the present disclosure.

During operation, the system audits an operation at an audit server and maintains a record associated with the operation in an audit log (operation 330). Next, the system protects the audit log based on a probability distribution (operation 360). The probability distribution indicates a frequency associated with audit log protection events. Thus, the system increases the unpredictability of the vulnerability window during which the audit log can be altered by a malicious attacker. Note that the system can merely change the probability distribution of the audit log protection events. It does not necessarily take any additional actions to protect the audit log except in circumstances that are deemed more risky. Thus, there is little additional performance cost associated with such enhanced audit log protection, since the periods of more frequent audit-log protection are balanced with periods of less frequent audit-log protection under less risky circumstances.

In some embodiments, enhanced audit log protection based on increased protection frequency can be triggered by one or more of: an auditing time window, an auditing depth, an object, a database query type, a database session, and a database user identity. For example, an administrator may configure the system to enhance protection of audit log that is associated with auditing events, which occur between 9:00 am and 5:00 pm of the day between Monday and Friday each week. As another example, the system may be configured to enhance protection of auditing logs, of which the associated auditing depth is above a predefined threshold level. Moreover, the system may be configured to enhance protection of audit log containing records related to a pre-specified query type or database object. For example, audit logs having auditing records associated with database operations that insert data into database tables may receive a high-level protection. Likewise, any auditing logs associated with database access to sensitive tables, views, columns, or other specified database objects, may receive additional protection. Also, any audit logs related to commands executed by an administrator or executed during a specific database session may receive enhanced protection.

In some embodiments, enhancing protection of the audit log involves digitally signing the audit log. Techniques described above with respect to reactive audit log protection are similarly applicable to probability-based audit log protection. For example, in response to certain database operations, the audit log requiring enhanced protection can be signed at an increased frequency or at an earlier than previously scheduled time. In addition, the system may protect the audit log by encrypting the audit log, increasing an access control level associated with the audit log, transmitting the audit log to a remote server, generating a backup digest of the audit log, generating an additional audit record in the audit log, and/or generating an alert.

In some embodiments, the probabilistic signing could change based on reactive auditing. For example, an administrator may define a probability distribution function that follows a normal distribution, in which the mean value of the distribution is adjusted in response to a shortened audit window. Alternatively, the probability distribution function may be adjusted to allow for more front-loaded auditing probability or any other distribution. In one embodiment, users can define the probability distribution function in any manner they see fit depending on the use-case.

Figure 4A:
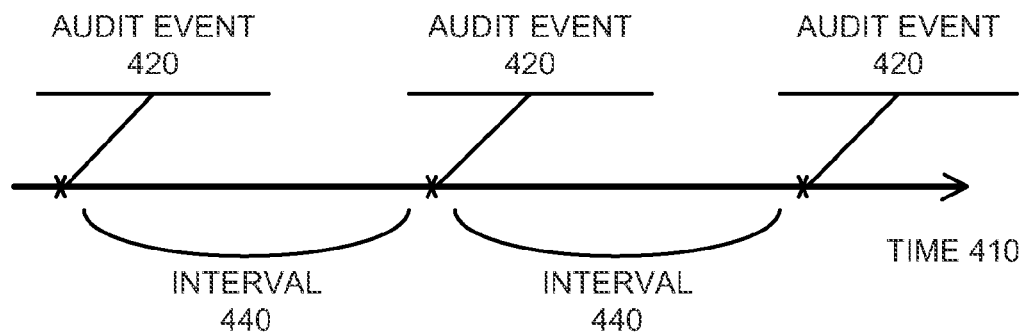
FIG. 4A presents a diagram illustrating a typical audit log protection scenario.

FIG. 4A presents a diagram illustrating an exemplary conventional audit log protection scenario. In this example, audit log protection events 420 occur at scheduled time on a timeline 410. For example, an administrator may configure audit server 140 to perform a particular audit log protection event 420 at interval 440, such as once every 10 minutes. A problem with such audit log protection mechanism is that the vulnerable window of opportunity during which the audit log is susceptible to security attacks is uniformly distributed along timeline 410. If an attacker finds out interval 440 after several attempts, the attacker will be predictably successful at its subsequent attacking attempts.

Figure 4B:
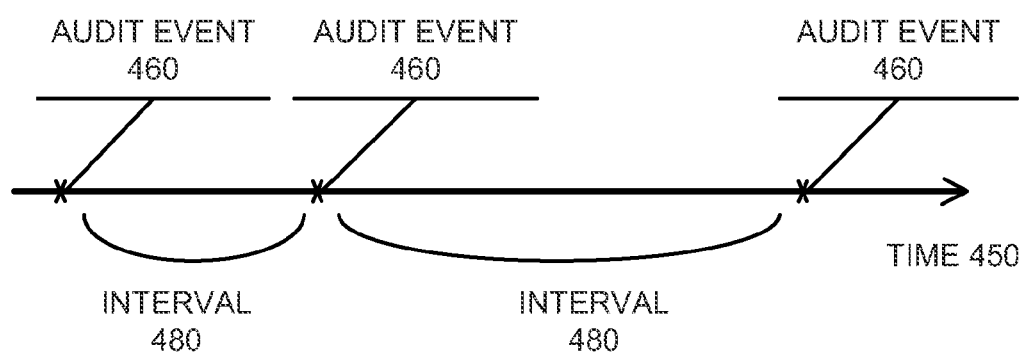
FIG. 4B presents a diagram illustrating an improved audit log protection scenario, in accordance with one embodiment of the present disclosure.

FIG. 4B presents a diagram illustrating an improved audit log protection scenario, in accordance with one embodiment of the present invention. In this embodiment, audit log protection events 460 occur at scheduled time on a timeline 450. An administrator may configure an audit server to perform a particular audit log protection event 460 at different intervals 480 based on a probability distribution. For example, an administrator may configure the audit server to sign the audit log randomly based on a predefined probability function, which restricts the minimum signing interval to 0 minute and the maximum signing interval to 20 minutes. In one embodiment, the probability function follows a normal distribution with a mean signing interval of 10 minutes. That is, the overall frequency of audit log protection events 460 remains the same. Thus, there is no additional performance cost associated with this improved audit log protection compared with the scenario illustrative above in reference to FIG. 4A.

Audit Log Protection System

Figure 5:
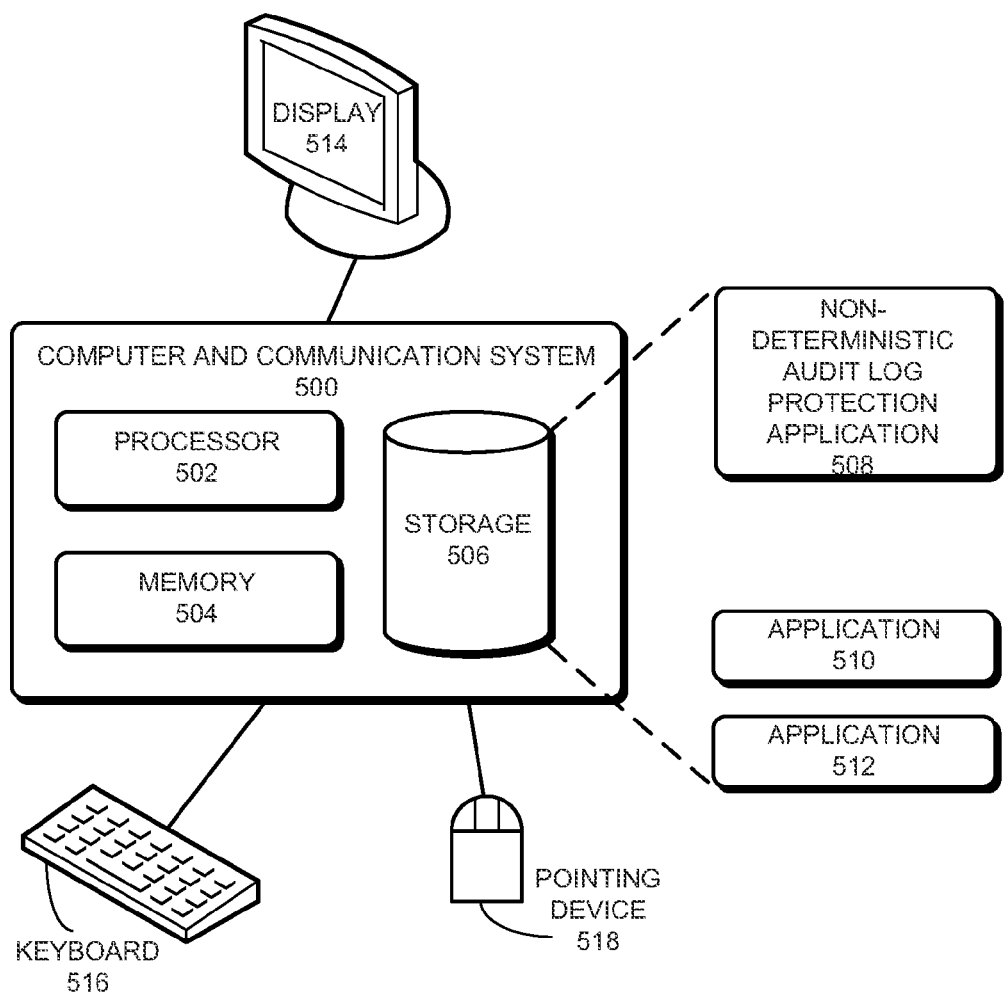
FIG. 5 presents a block diagram illustrating a system for non-deterministic audit log protection, in accordance with one embodiment of the present disclosure.

FIG. 5 presents a block diagram illustrating a system for non-deterministic audit log protection, in accordance with one embodiment of the present disclosure. In FIG. 5, a computer and communication system 500 includes a processor 502, a memory 504, and a storage device 506. Storage device 506 stores programs to be executed by processor 502. Specifically, storage device 506 stores a non-deterministic audit log protection application 508, as well as other applications, such as applications 510 and 512. During operation, non-deterministic audit application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a non-transitory computer-readable storage medium, which may be any device that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, ASICs, FPGAs, and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for non-deterministic audit log protection, the method comprising:
   auditing, by a computer system, an operation, wherein the computer system maintains a record associated with the operation in an audit log;
   determining, by the computer system, a type of query command associated with the operation; and
   in response to the determining a type of query command associated with the operation, protecting the audit log by signing the audit log at an increased frequency or signing pending audit records at an earlier than scheduled time, thereby reducing a vulnerable time-period during which the audit log can be compromised.

2. The method of claim 1, wherein the operation comprises at least one of:
   execution of a database command, whether successful or unsuccessful;
   a successful or unsuccessful logon to a user session;
   an access to the audit log;
   a change to an audit policy;
   selection of a system or user created table;
   modification of a system or user created table; and
   an attempt to alter the audit log.

3. The method of claim 1, wherein protecting the audit log comprises at least one of the following operations:
   increasing an access control level associated with the audit log;
   transmitting the audit log to a remote server;
   transmitting a digital signature and time stamp for the audit log to a remote server;
   transmitting a time stamp to a remote server;
   generating a backup digest of the audit log; and
   generating an additional audit record in the audit log.

4. The method of claim 3, wherein the protecting the audit log comprises selectively signing an administrative action.

5. The method of claim 1, wherein the computer system protects a particular audit log by determining whether an associated operation satisfies a criteria that indicates at least one of:
   an auditing time window;
   a depth of auditing;
   an object for auditing;
   a database session; and
   a user session.

6. A non-transitory computer-readable storage medium storing instructions which when executed by a computer cause the computer to perform a method for non-deterministic audit log protection, the method comprising:
   auditing, an operation, wherein the computer maintains a record associated with the operation in an audit log;
   determining a type of query command associated with the operation; and
   in response to the determining a type of query command associated with the operation, protecting the audit log by signing the audit log at an increased frequency or signing pending audit records at an earlier than scheduled time, thereby reducing a vulnerable time-period during which the audit log can be compromised.

7. The non-transitory computer-readable storage medium of claim 6, wherein the operation comprises at least one of:
   execution of a database command, whether successful or unsuccessful;
   a successful or unsuccessful logon to a user session;
   an access to the audit log;
   a change to an audit policy;
   selection of a system or user created table;
   modification of a system or user created table; and
   an attempt to alter the audit log.

8. The non-transitory computer-readable storage medium of claim 6, wherein the protecting the audit log comprises at least one of the following operations:
   increasing an access control level associated with the audit log;
   transmitting the audit log to a remote server;
   transmitting a digital signature and time stamp for the audit log to a remote server;
   transmitting a time stamp to a remote server;
   generating a backup digest of the audit log; and
   generating an additional audit record in the audit log.

9. The non-transitory computer-readable storage medium of claim 8, wherein the protecting the audit log comprises selectively signing an administrative action.

10. The non-transitory computer-readable storage medium of claim 6, wherein the computer protects a particular audit log by determining whether an associated operation satisfies a criteria that indicates at least one of:
    an auditing time window;
    a depth of auditing;
    an object for auditing;
    a database session; and
    a user session.

11. A computer-executed method for non-deterministic audit log protection, the method comprising:
    auditing, by a computer system, an operation, wherein the computer system maintains a record associated with the operation in an audit log;
    computing a probability distribution function that indicates a frequency for performing audit log protection events; and
    protecting, by the computer system, the audit log by signing the audit log at an increased frequency or signing pending audit records at an earlier than scheduled time, wherein the frequency is determined by the previously computed probability distribution function.

12. The method of claim 11, further comprising determining the probability distribution based at least on one of:
    an auditing time window;
    an auditing depth;
    an object;
    a database query type;
    a database session; and
    a database user who initiates the operation.

13. The method of claim 11, wherein the protecting the audit log comprises signing the audit log and storing the corresponding digital signature in a remote location, or generating a cryptographic hash of the audit log and storing the cryptographic hash in a remote location.

14. The method of claim 13, wherein the probability distribution is based on at least one of:
    a type of the operation;
    a frequency of execution associated with the operation; and
    a history of execution associated with the operation.

15. The method of claim 11, wherein the computer system adjusts a mean value of the probability distributed in response to a predefined criterion being satisfied.

16. The computer-executed method of claim 11, further comprising:
   receiving user input indicating a mean value of a different probability distribution function; and
   adjusting the mean value of the previously computed probability distribution function based on the received user input.

17. A non-transitory computer-readable storage medium storing instructions which when executed by a computer cause the computer to perform a method for non-deterministic auditing, the method comprising:
   auditing, by the computer, an operation, wherein the computer maintains a record associated with the operation in an audit log;
   computing a probability distribution function that indicates a frequency for performing audit log protection events; and
   protecting, by the computer, the audit log by signing the audit log at an increased frequency or signing pending audit records at an earlier than scheduled time, wherein the frequency is determined by the previously computed probability distribution function.

18. The non-transitory computer-readable storage medium of claim 17, wherein the auditing of the operation is based on at least one of:
   an auditing time window;
   an auditing depth;
   an object;
   a database query type;
   a database session; and
   a database user who initiates the operation.

19. The non-transitory computer-readable storage medium of claim 17, wherein the protecting the audit log comprises signing the audit log and storing the corresponding digital signature in a remote location, or generating a cryptographic hash of the audit log and storing the cryptographic hash in a remote location.

20. The non-transitory computer-readable storage medium of claim 19, wherein the probability distribution adjusts in response to a changed auditing factor that comprises at least one of:
   a type of the operation;
   a frequency of execution associated with the operation; and
   a history of execution associated with the operation.

21. The non-transitory computer-readable storage medium of claim 17, wherein the mean value of the probability distributed is adjusted in response to a predefined criterion being satisfied.

22. The non-transitory computer-readable storage medium of claim 17, wherein the computer-readable storage medium stores additional instructions that, when executed, cause the computer to perform additional steps comprising:
   receiving user input indicating a mean value of a different probability distribution function; and
   adjusting the mean value of the previously computed probability distribution function based on the received user input.

* * * * *